Aug. 11, 1931.  B. F. SHIELDS  1,818,100
FRICTION BRAKE
Filed Nov. 28, 1927  2 Sheets-Sheet 1

INVENTOR
Benjamin F. Shields
BY
Fred C. Matheny
ATTORNEY

Aug. 11, 1931. B. F. SHIELDS 1,818,100
FRICTION BRAKE
Filed Nov. 28, 1927 2 Sheets-Sheet 2

INVENTOR
Benjamin F. Shields
BY
Fred C. Matheny
ATTORNEY

Patented Aug. 11, 1931

1,818,100

UNITED STATES PATENT OFFICE

BENJAMIN F. SHIELDS, OF SEATTLE, WASHINGTON

FRICTION BRAKE

Application filed November 28, 1927. Serial No. 236,313.

My invention relates to improvements in friction brakes of the type commonly termed external brakes, which embody a brake lining operatively disposed between a brake band and a brake drum.

The object of my invention is to provide an endless, circular molded brake lining which is readily applied to, or detached from a brake drum without the use of rivets thus saving time, labor and expense and which affords a full three hundred and sixty degrees of brake surface for contact with a brake band.

Another object of the invention is to provide a brake of this nature in which the inner circumference of the moulded brake lining is provided with one or more corrugations and the outer circumference of the brake drum is similarly corrugated to receive the corrugations on the brake lining, said corrugations serving as a means for tightening the lining on the drum and for preventing relative rotation between the lining and the drum.

Another object is to provide an external brake in which the brake lining is secured to the brake drum and has frictional contact with a surrounding brake band. This reverses the usual order in external brakes in which it is common practice to secure the brake lining to the brake band, and makes it possible for me to use an endless circular brake lining and gives me the advantage of better heat radiation and of a friction surface of larger diameter for the same size brake.

A further object is to provide a brake band having greatly improved heat radiating qualities.

Other and more specific objects will be apparent from the following description taken in connection with the accompanying drawings.

In the drawings Figure 1 is a detached perspective view of a brake lining constructed in accordance with my invention.

Like reference numerals designate like parts throughout the several views.

In the construction of external brakes for motor vehicles it is universal practice to secure a strip of brake lining material within a flexible brake band by rivets and to place the same around a brake drum in such a manner that the brake lining is applied frictionally to the outer circumference of the brake drum by tightening of the band. This makes the inner circumference of the brake lining the friction surface thereby generating practically all of the heat between the brake lining and the brake drum and often over heating and damaging the brakes and heating up the entire hub of the wheel by heat that is radiated through the brake drum, said heat tending to loosen the spokes of wooden wheels and being detrimental to the wheel generally. In accordance with my invention I provide an endless circular moulded brake lining which is secured on the brake drum and rotates therewith and has frictional contact with the brake band so as to generate the greater portion of its heat between the brake lining and the brake band whereby this heat will be radiated through the brake band into the air, keeping the brakes and the wheel cool, reducing deterioration due to heat and obviating the danger of burning out the brake linings. To facilitate heat radiation I further provide the brake band with inserts of material capable of radiating heat at a much faster rate than the material, usually steel, of which the brake band is constructed.

Figure 1:
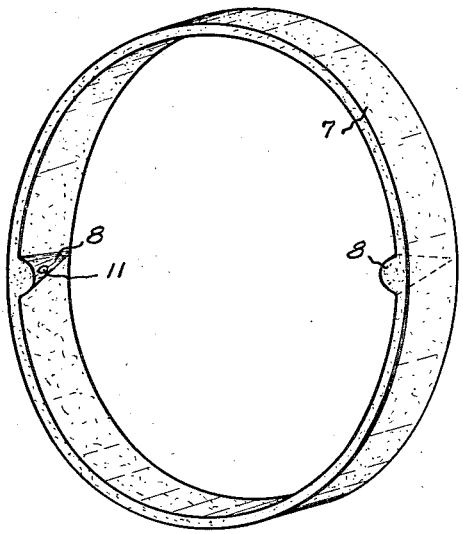
Figure 2:
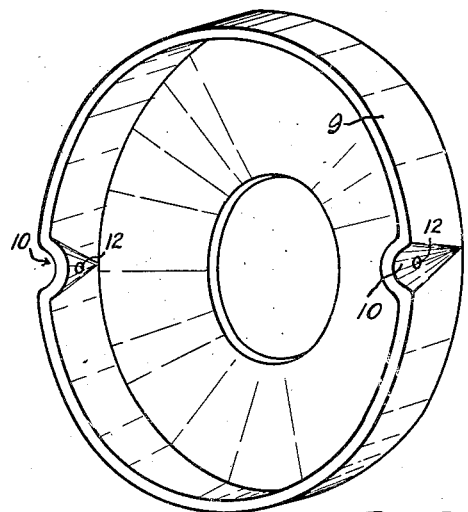
Fig. 2 is a detached perspective view of a brake drum adapted to receive the brake lining shown in Fig. 1.
Figure 3:
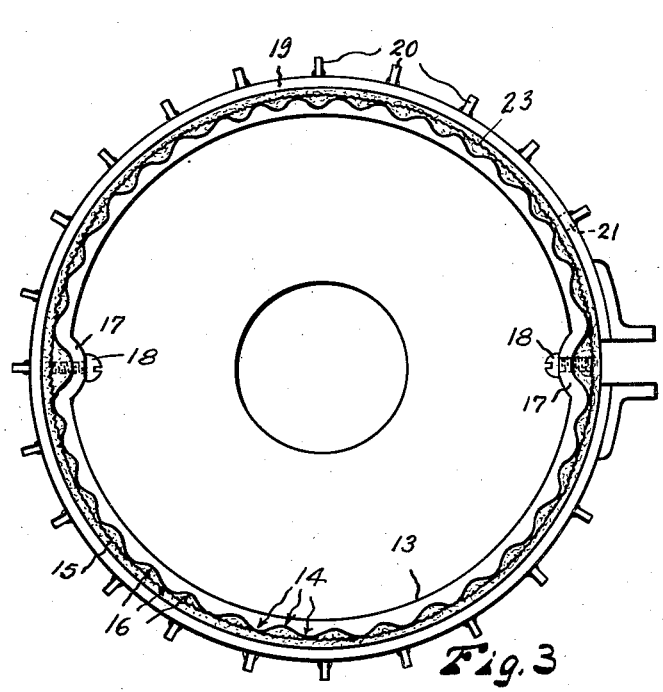
Fig. 3 is an elevation of a brake drum with a brake lining secured thereon and a brake band surrounding the lining, all of said parts being constructed in accordance with my invention, the lining and drum having a plurality of corrugations, thereby differing from Figs. 1 and 2 in which only two corrugations are shown.
Figure 4:
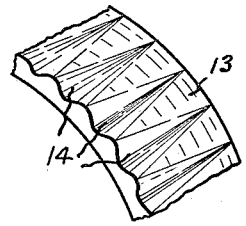
Figs. 4, 5 and 6 are perspective views of fragments of the brake drum, brake lining and brake band respectively shown in Fig. 3.
Figure 5:
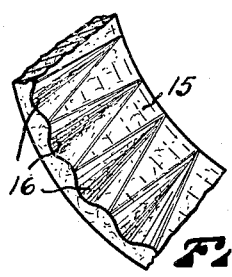

Referring to the drawings, in Fig. 1, I show an endless brake lining 7 moulded in the shape of a ring or circle and having one or more corrugations 8 formed on its inner surface. The brake lining 7 is adapted to fit onto a brake drum 9, Fig. 2 that has indentations 10 corresponding in number and shape to the corrugations 8 on the lining. The corrugations 8 and indentations 10 are preferably provided with registering holes 11 and 12 wherein screws or similar securing means may be inserted to hold the lining on the drum. The corrugations 8 and indentations 10 are preferably tapered, as shown, so that the lining 7 may be more easily started over the drum in applying the same and will tighten on the drum as it is pressed into place.

In Figs. 3, 4, 5 and 6 I have shown a preferred embodiment of my invention in which a brake drum 13 is provided with a series of external, inclined, corrugations 14 extending entirely around the same and an endless, circular, molded brake lining 15 is provided with a series of inclined internal corrugations 16 adapted to interfit the corrugations on the brake drum 13. The inclination of the corrugations makes it easy to start the circular brake lining over the brake drum in applying the same and also serves to tighten the brake lining onto the brake drum as the lining is pressed into place. The interfitting of the corrugations prevents relative rotation of the lining and drum and the corrugations form anchor means at frequent intervals entirely around the lining for securing the same to the drum so that there will be very little tension exerted on any part of the lining when the brakes are set. The corrugations in the brake lining and brake drum may be made larger and deeper, as shown at 17, at points where it is desired to insert screws 18 for preventing the lining from slipping off the drum wire mesh or similar reinforcing 23 is preferably embedded in the brake lining to give greater tensile strength to the same.

The corrugations 14 in the drums 13, being deeper at the open edge of the drum and pinching out at the other edge make it possible to press or stamp said corrugations in the drum.

The corrugations of the lining and drum may be varied in form so long as they constitute relatively raised and depressed portions arranged to interfit to prevent circumferential movement of the lining on the drum.

Figure 6:
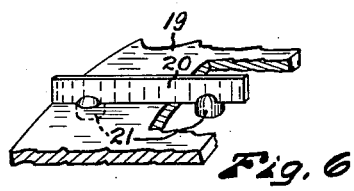

Surrounding the brake lining 15 and arranged for frictional engagement with the outer circumference of said lining is a brake band 19 preferably of spring steel, having a plurality of heat radiating devices incorporated into its construction. These heat radiating devices may be any form of inserts of metal having a high coefficient of heat conductivity and extending from the inner to the outer surface of the brake band. In practice I prefer to use copper fins 20 having integral copper rivets 21 that extend through the band, the fins 20 extending crosswise of the exterior of the band, as shown in Fig. 6, so as to catch the air and radiate the heat. The heat being practically all generated between the band and the lining, will be conducted out by the rivets 21 and dissipated through the fins 20. Any suitable means may be provided for contracting the brake band and for holding the same against rotation. The band 19 with the heat radiating means is especially adapted for use on my brake in which the heat is generated between the lining and the band rather than between the lining and the brake drum.

The lining and drum are simple in construction, efficient in operation and not expensive to manufacture. The lining being a rotating part, instead of a stationary part will wear down evenly around its entire circumference until it is practically entirely worn out instead of wearing in spots as a stationary brake lining is liable to do.

The ease and convenience of applying this lining and of removing old linings and the saving in the cost of servicing the brakes make my brake especially desirable. The relining of the usual brake requires the exercise of considerable mechanical skill and the use of tools for drilling and riveting. For relining this brake it is only necessary to take off the wheel, remove the screws that hold the old lining, remove said old lining, slip on a new lining and replace the screws. This makes it possible for the average driver to re-line his own brakes.

Figure 7:
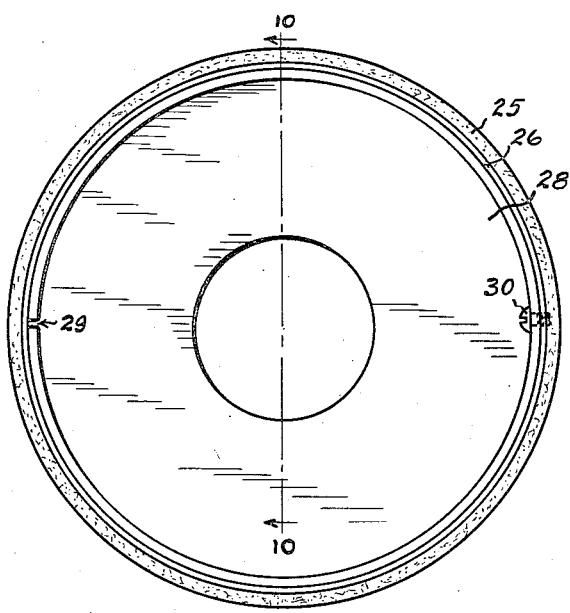
Fig. 7 is an elevation of a brake lining molded on a circular band.
Figure 8:
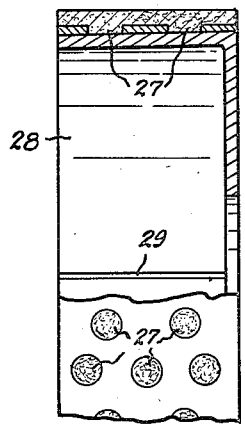
Fig. 8 is a section on line 10—10 of Fig. 7.

In Figs. 7 and 8 I show a brake lining 25 which is moulded on a circular hoop like, base ring 26 which has holes therein into which sections 27 of the lining project. The base ring 26 is smooth and not corrugated on the inside but preferably has a slight taper and is adapted to fit over a slightly tapered drum 28, the taper serving to tighten the ring 26 on the drum. The drum 28 may have one or more saw cuts 29 to allow it to contact as the lining and ring are forced thereover and one or more screws 30 may be inserted through the drum and into the lining. The base ring 26 affords tensile strength and makes it possible to dispense with the corrugations.

The foregoing description and accompanying drawings clearly disclose a preferred embodiment of my invention but it will be understood that this disclosure is merely illustrative and that such changes in this brake apparatus may be made as are fairly within the scope and spirit of the following claims.

I claim:

1. In a brake of the external band type, a rotatable drum, an endless one piece molded brake lining arranged to extend entirely around said drum and interfitting corrugations on the interior of the lining and the exterior of the drum to prevent relative rotation between the lining and the drum.

2. The apparatus as described in claim 1 in which the interfitting corrugations on the lining and drum are tapered so that their greatest depth is at one edge of the lining and drum and they pinch out at the other edge of the lining and drum.

3. In an external brake, a brake drum having one or more external corrugations and an endless circular one piece molded brake lining arranged to fit over said brake drum and having one or more internal corrugations arranged to interfit the corrugations of said brake drum.

4. In an external brake, a rotary brake drum having a plurality of corrugations on its circumference, an endless circular one piece molded brake lining having a plurality of internal corrugations arranged to interfit the corrugations on the brake drum when the brake lining is placed on the brake drum and a non-rotatable brake band extending around said brake lining.

5. In an external brake, a brake drum having a plurality of corrugations on its circumference, an endless circular one piece molded brake lining having a plurality of internal corrugations arranged to interfit the corrugations on the brake drum when the lining is placed on the drum, means for securing the lining against sidewise displacement on the drum and a brake band extending around said brake lining.

6. In a brake of the class described, a brake drum having inclined circumferential corrugations extending crosswise thereof, said corrugations being of maximum depth at one edge of the brake drum and pinching out at the other edge of the drum, an endless circular molded brake lining arranged to fit over the brake drum and having inclined internal corrugations adapted to interfit the inclined external corrugations of the brake drum for tightening the lining on the drum and preventing relative rotation between the lining and the drum and a contractible friction band extending around said brake lining.

7. In a brake of the class described a rotatable brake drum, a brake lining secured to the outer circumference of said brake drum, a brake band extending around said brake lining and having frictional contact with the exterior of the lining and heat radiating fins on the outside of said band.

8. In an external brake, a rotatable brake drum, an endless brake lining secured on said brake drum, a metal brake band extending around said brake lining for frictionally engaging the same and insert means having a high coefficient of heat conductivity and extending from the inside to the outside of said brake band for radiating heat that is generated by frictional contact of the lining and the band.

9. The apparatus as described in claim 8 in which the heat radiating insert means embody copper fins having integral copper rivets arranged to extend through the brake band.

10. In a brake of the external band type, a rotatable brake drum having external relatively raised and depressed portions, an endless circular molded brake lining having internal relatively raised and depressed portions and arranged to fit said brake drum, reinforcing means embedded within said brake lining, and means for preventing relative rotation between the brake lining and the brake drum.

11. As an article of manufacture, an endless molded circular brake lining having an inner surface provided with relatively raised and depressed portions and having a wire mesh reinforcing embedded therein.

12. As an article of manufacture, an endless molded brake lining having a relatively smooth convex outer surface and an inner surface provided with relatively raised and depressed portions and wire mesh reinforcing embedded in said brake lining.

13. In combination, an endless molded brake lining having an inner surface provided with relatively raised and depressed portions, wire mesh reinforcing embedded in said brake lining, and a supporting member for receiving said lining said supporting member having external means interfitting with the raised and depressed portions of the lining.

14. In combination, an endless annular molded brake lining having an external convex friction surface and an inner concave surface provided with relatively raised and depressed portions, an annular wire mesh reinforcing member embedded in said brake lining and a brake drum having relatively raised and depressed peripheral portions arranged to interfit with the raised and depressed portions of said lining when said lining is placed on said drum.

The foregoing specification signed at Seattle, Wash., this 21st day of Nov., 1927.

BENJAMIN F. SHIELDS.